(No Model.) 3 Sheets—Sheet 1.
W. H. KNIGHT.
ELECTRIC MOTOR TRUCK.
No. 458,584. Patented Sept. 1, 1891.
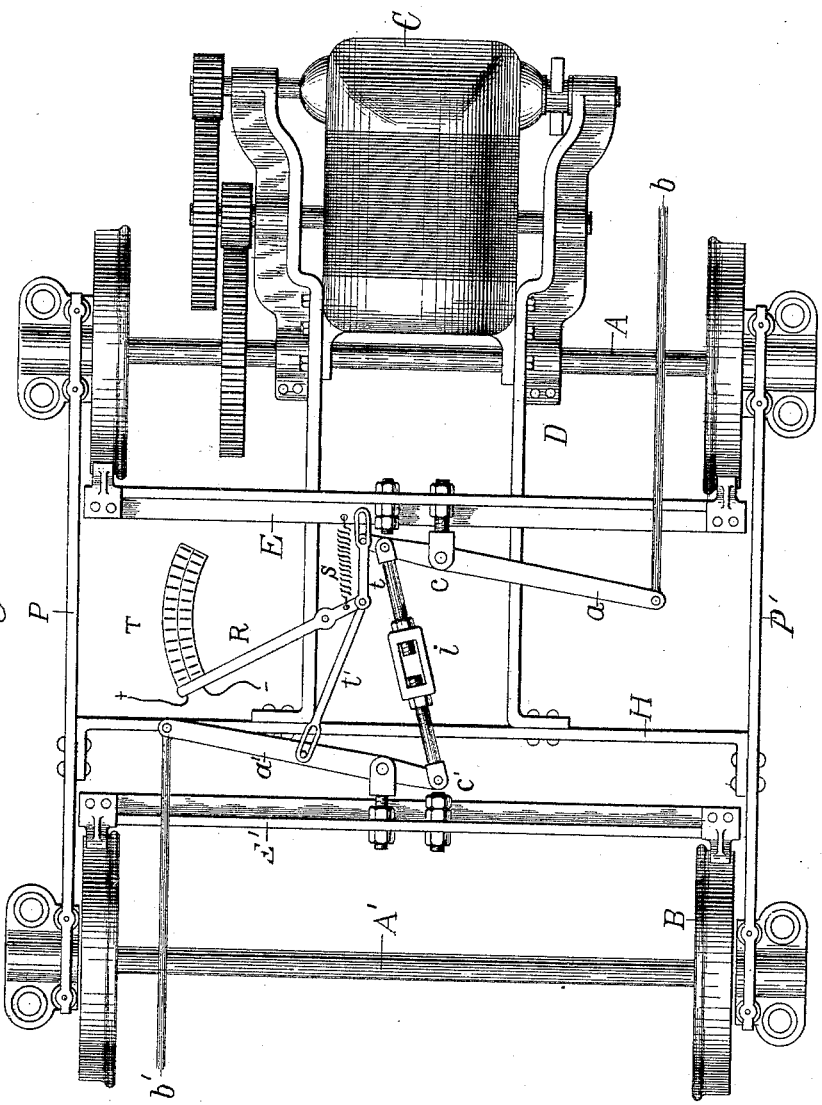
Fig. I.
Witnesses.
John F. Nelson
Julius M. Elliot
Inventor
Walter H. Knight
by Bentley Knight
Atty.

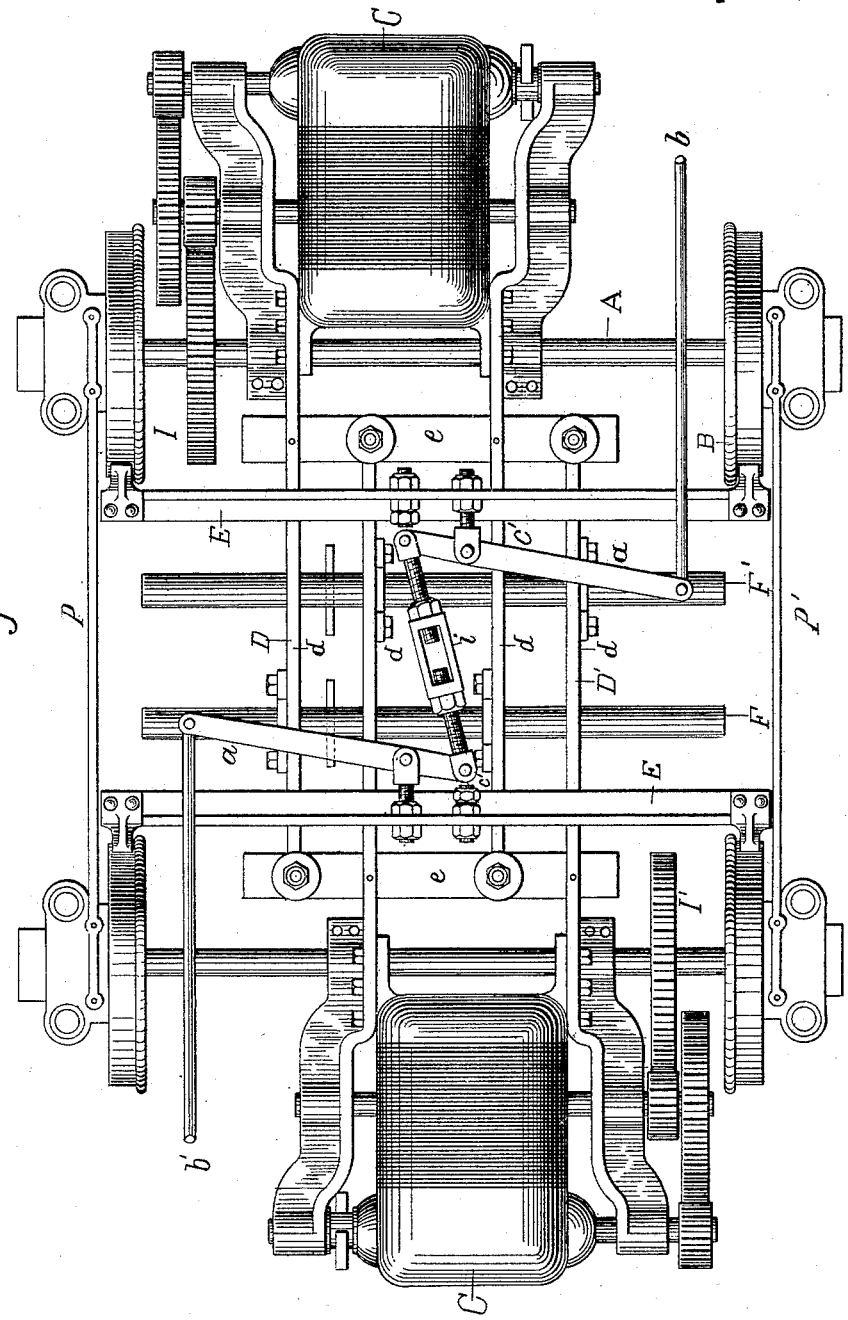

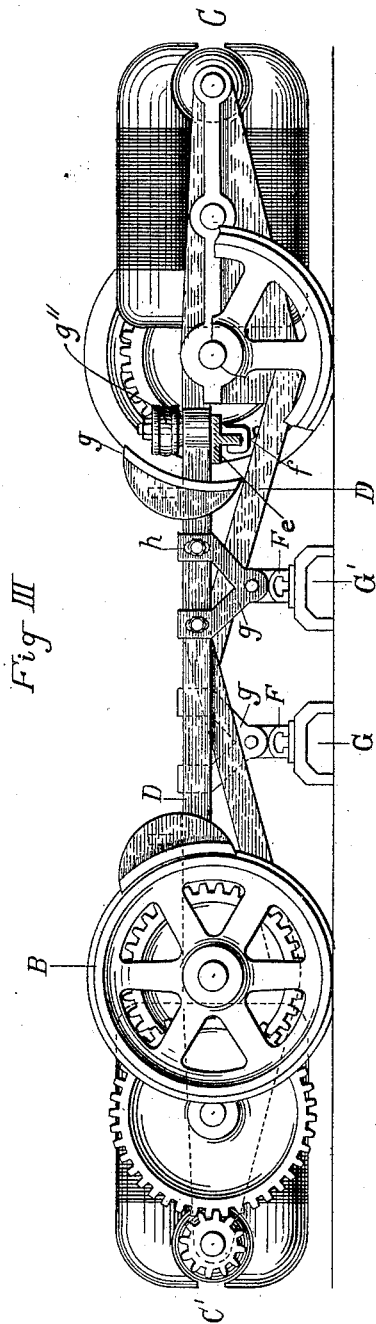

UNITED STATES PATENT OFFICE.

WALTER H. KNIGHT, OF NEW YORK, N. Y.

ELECTRIC-MOTOR TRUCK.

SPECIFICATION forming part of Letters Patent No. 458,584, dated September 1, 1891.

Application filed March 5, 1889. Serial No. 301,881. (No model.)

*To all whom it may concern:*

Be it known that I, WALTER H. KNIGHT, a citizen of the United States, residing at New York, in the county of New York, State of New York, have invented certain new and useful Improvements in Electric-Motor Trucks, of which the following is a specification.

My invention relates to an electric locomotive for use upon an electric railway, and it has reference to (*a*,) the means for mounting the propelling motors upon the railway-truck; (*b*,) the arrangement of the brakes and operating mechanism; (*c*,) the means for connecting the contact devices to the vehicle, as well as certain novel combinations into which the contact device enters.

The need for and advantages of my various improvements will be hereinafter described, and for the scope of my invention reference is made to the claims.

The accompanying sheets of drawings illustrate the invention, wherein—

Figure I is a view of a car-truck provided with a single motor and the compression-brake. Fig. II is a plan view of a similar truck having two motors and showing the transverse plow-guides. Fig. III is a side view of Fig. II, having a portion of one wheel broken away.

A represents the axles, and B the wheels, of a railway-car truck.

Referring first to Fig. I, C is an electric motor geared to axle A and fulcrumed thereon. This motor extends down between the wheels on the outside of the axle and is held in position by the frame D, which is journaled upon the axle and carries the armature of the motor and the counter-shaft at its outer end, while its inner end is connected to a transverse bar H, having bearings upon the journal-boxes of the opposite axle.

In Figs. II and III two motors C C' are shown geared to the two axles of the truck, and preferably outside of the same, whereby their centers of gravity fall upon opposite sides of their bearings upon the axles. I do not intend, however, to be limited to the outside motors, for the same functions would be gained by my invention were they otherwise arranged. The motors are connected to a common truck-framing bridging the axles, and are thereby held in position. This framing is made up of the two motor-frames D D', which project toward each other and interlock or bear against one another in such a way as to form in effect a single truck-framing, through the intervention of which the motors are counterbalanced one against the other and held in place by their own weight. Fig. II shows in detail how this is accomplished. The two side bars *d d* of the motor-frame D are joined by the cross-piece *e*, and in like manner the side bars *d' d'* of motor-frame D' by piece *e'*. The motor-frame D has therefore a bearing upon the cross-piece *e'* and a second bearing under side bars *d' d'* by means of cross-piece *e*, and likewise the frame D' has two similar bearings, one upward and the other downward, against frame D. As these bearings are at considerable distances apart, a substantially rigid truck-framing is formed having a sort of jointed connection between its two ends, which, by reason of the looseness of the fittings or the spring of the bars, allows a slight rotating movement of the motors about the axles, but which will hold them firmly against any undue displacement. The side bars are connected to the cross-pieces *e e'* by clamps, which hook under the cross-piece, as at *f*, and are secured by nuts. If desired, elastic washers *g''* may be placed between the side bars and nuts, thereby securing greater flexibility for the frame and allowing the motors additional independent movement. Side bars P P' outside the car-wheels join the axles and hold them in place. An important advantage is gained by hanging the motors to the trucks in the manner above described, for as the motors project in opposite directions from their respective axles they engage the driven gear-wheels I I' on opposite sides of their respective centers, and hence when in operation they tend to ride around the gear-wheels in opposite directions, so that the pulls on the truck-frame exerted by the two motors in operation oppose each other, thereby greatly relieving the frame from strains. For example, if it be desired to start the car or if the car be moving in the direction of the arrow, Fig. II, the motor C will tend to ride down toward the ground and will exert upon the common supporting-frame an upward pull, which will be equalized by the downward pull of the motor C', tending to move up toward the car-body. This same function is gained whether the motors be outside or inside the axles, and, in fact, whenever the connections upholding the free ends of the motors are on opposite sides of the respective bearings of the motors.

In Fig. II it is seen that the two motors are diagonally arranged one on each side of the center of the axles, for thereby space is economized and the motor-frames do not interfere with one another. Inasmuch as the motors extend down between the wheels on the outside of the axles, they would interfere with the working of the ordinary pull-brake, and I have therefore provided compression-brakes, which are located between the axles and are pushed against the wheels. E E' represent these brakes, consisting of ordinary brake-beams and shoes carried thereby. The brake-beams slide on the frame-bars of the motors and are operated by the levers $a\ a'$ and rods $b\ b'$, extending therefrom to either end of the car. The levers are fulcrumed to the brake-beams at $c\ c'$, and between their inner ends there is an adjustable connection consisting of two screw-threaded rods united by a turn-buckle $i$.

In Fig. I a circuit-controlling mechanism is shown, which is connected with and operated by the brake mechanism. T is a resistance-box, and R a pivoted switch-lever adapted to sweep over and cut the resistance into and out of circuit. This lever is operated by the arms $t\ t'$, which have a pin and slotted link connection with brake-levers $a\ a'$, while a spring $s$ restores the lever to its normal position. The contact devices or plows G G' are located between the car-axles and near the center of the truck, because they are then out of the way of the motors and less movement relatively to the vehicle is needed when passing curves.

The plows are connected to the vehicle as follows: Transverse guides F F' are suspended below the car-axles and only a short distance from the surface of the ground by brackets $g\ g'$, fastened to the motor-frames D D', and travelers are provided upon the plows, which engage and move freely along said guides. Inasmuch as the guides and plows are on one side of the axle and the motors on the other, the plows tend to counterbalance the motors. The supporting-brackets are slotted, as at $h$, so that they can be adjusted vertically and the height of the guides above the ground correspondingly regulated.

It should be observed that by suspending the guides low down they are beneath the brake-operating mechanism and all parts of the truck-frame, so that there is nothing to interfere with the free movement of the plows from side to side of the car; also, that the guides are supported directly upon the truck-frame independently of the car-body, so that the movement of the latter upon its springs does not affect the contact device, and as the plows are nearly in the center of the car practically no swiveling motion upon curves is needed.

In my application, Serial No. 277,202, filed June 15, 1888, I have shown and claimed an electric motor journaled upon a car-axle and supported by a connection to a truck-frame which is independent of the car-body, and springs supporting the car-body, and hence no claims are made in this specification to such a construction other than such as are hereinafter specifically set forth.

What I claim as new, and desire to secure by Letters Patent, is—

1. The combination, in an electric locomotive, of a motor fulcrumed upon the axle and extending down between the wheels on the outside of the axle with frame-bars counterbalancing the motor upon the opposite side of the axle and a compression-brake sliding on said frame-bars.

2. The combination, in an electric locomotive, of a truck-framing extending between opposite axles, to which the motors are connected and by which they are held in place, with a compression-brake between the axles, sliding on said frame, and operating connections for the brake, substantially as described.

3. In a motor-truck, the combination of motors geared to the two axles respectively, each motor being outside its respective axle and provided with a separate gearing, and a common framing upholding the outer ends of the motors.

4. The combination of the axles of a railway-truck and motors journaled near one end concentric with the axles, whereby each motor tends to turn about its respective axle, with a frame holding the motors in place, and connections between the frame and the motors on opposite sides of the motor-bearings.

5. The combination of two motors fulcrumed upon the axles of an electric locomotive and having their centers of gravity on opposite sides of their respective axles with frame-bars projecting from the two motors and bearing against each other, thereby holding the motors in place.

6. The combination of two motors fulcrumed upon the axles of an electric locomotive and having their centers of gravity upon the outside of their respective axles with a mechanical connection between the two motors, whereby each counterbalances the other, substantially as described.

7. The combination of two motors outside the axles of an electric locomotive and fulcrumed thereon with frame-bars projecting from the two motors inside of the axles and interlocking with each other, whereby the tendency of the bars to turn in opposite directions is resisted by their bearings upon one another.

8. The combination, in an electric locomotive, of two motors fulcrumed so that their centers of gravity fall upon opposite sides of their respective journals with rigid mechanical connections from the two motors projecting toward each other and bearing against one another, whereby the motors are held in place by their own weight.

9. The combination of side bars joining the axles of a truck and outside the wheels with a motor outside the axle, a framing therefor journaled on the axle, and a connection upholding the free end of the motor.

10. The combination of an electric motor outside of and fulcrumed on the axle of a car with a frame inside the axle supporting the motor in position, a transverse guide attached to said frame, and a plow or contact device movable along the guide.

11. The combination, in an electric locomotive, of two motors outside of the axles of the vehicle with contact devices and connections permitting free transverse movement of the contact devices inside of the axles, substantially as described.

12. The combination of a motor centered around the axle of a car-truck, a contact device on the opposite side of the axle, and an intermediate connection between the contact device and motor, whereby they tend to counterbalance each other.

13. The combination of the motor outside the car-axle and the frame bar or bars inside the axle, by which the motor is held in position, with a contact device connected to said bar, substantially as described.

14. The combination, in an electric locomotive, of longitudinal frame-bars joining opposite axles and a transverse plow-guide below the said bars with a contact device having a traveling connection with said guide.

15. The combination, in an electric locomotive, of a framing joining the opposite axles of a railway-truck and a transverse plow-guide connected to said framing with a contact device having a traveling connection along said guide.

16. The combination of the motors outside the car-axles, the frame-bars bearing against each other inside the axles and holding the motors in place, and the transverse guides carried by and below said frame-bars with contact devices movable freely along said guides.

17. An electric-motor truck comprising an electric motor and motor-supporting frame carried by the axles beneath the car-body, brakes for the wheels on the respective axles, brake-gear connecting them, a transverse guide supported below said frame and brake-gear, and a contact device free to travel along said guide, as described.

18. The combination, in an electric locomotive, of a transverse guide supported between and below the car-axles and a contact device having a movable connection therewith, whereby the movement of the contact device is unobstructed by the frame of the truck.

19. The combination, in an electric locomotive, of a car-truck and a transverse guide supported directly upon the truck independent of the car-body, and a contact device having a movable connection with said guide.

20. The combination, in an electric locomotive, of a transverse guide supported between the car-axles and independent of the car-body with a contact device having a movable connection with said guide.

21. The combination, in an electric locomotive, of a transverse guide vertically adjustable upon its support and a contact device having a traveling connection along said guide.

22. The combination, in an electric locomotive, of two transverse guides independently adjustable and contact devices having traveling connections with said guides.

23. The combination, in an electrically-propelled vehicle, of a brake and controlling mechanism extending to opposite ends of the vehicle with a contact device extending into a slotted conduit and an intermediate connection permitting free lateral movement of the contact device relatively to the vehicle and placed below the said brake and controlling mechanism, so as to be independent thereof.

WALTER H. KNIGHT.

Witnesses:
F. O. BLACKWELL,
J. L. BLACKWELL.